United States Patent [19]

Bentzen-Bilkvist et al.

[11] 4,140,350
[45] Feb. 20, 1979

[54] SELF REGULATING SUCTION NOZZLE

[75] Inventors: Ib Bentzen-Bilkvist, Ann Arbor, Mich.; Donald S. Allen, Toledo, Ohio

[73] Assignee: Dundee Cement Company, Dundee, Mich.

[21] Appl. No.: 833,120

[22] Filed: Sep. 14, 1977

[51] Int. Cl.$^2$ ............................................. B65G 53/42
[52] U.S. Cl. ...................................................... 302/58
[58] Field of Search ......................... 302/4, 5, 7, 11, 12, 302/13, 47, 56, 58; 15/415 R, 421

[56] References Cited
U.S. PATENT DOCUMENTS

| | | | |
|---|---|---|---|
| 289,315 | 11/1883 | Smith | 302/58 |
| 692,106 | 1/1902 | Bedarrides | 302/58 |
| 1,355,507 | 10/1920 | Roever | 302/58 |
| 2,970,865 | 2/1961 | Finnegan | 302/58 |
| 3,876,258 | 4/1975 | Abderhalden | 302/58 |
| 4,011,624 | 3/1977 | Proett | 15/415 R |

Primary Examiner—Robert B. Reeves
Assistant Examiner—Jeffrey V. Nase
Attorney, Agent, or Firm—Cullen, Sloman, Cantor, Grauer, Scott & Rutherford

[57] ABSTRACT

An improved nozzle for unloading dry bulk particulate material by suction through the nozzle. A transport medium such as air is drawn by the suction to mix with and thus fluidize the material so that the material may be drawn up through the nozzle. The nozzle is tapered at its first or intake end to cut down on dust emission. The nozzle is of substantially constant internal cross sectional area between its first and second ends to provide the most efficient operation. The nozzle is self regulating in that the suction together with the volume of dry bulk particulate material determine the amount of air needed to fluidize and transport the material.

3 Claims, 7 Drawing Figures

SELF REGULATING SUCTION NOZZLE

CROSS REFERENCE TO RELATED APPLICATIONS

The suction nozzle of the present system is usable in a Barge Unloading System as disclosed in copending application Ser. No. 709,731, filed July 29, 1976 now abandoned, and in an Aerating Barge Unloading System as disclosed in copending application Ser. No. 709,846 also filed July 29, 1976 now U.S. Pat. No. 4,085,975, both assigned to the Assignee of the present invention.

BACKGROUND OF THE INVENTION

This invention relates generally to an improved suction nozzle for use in unloading dry bulk particulate material from a container such as a vessel, barge or the like.

In the unloading of such dry bulk particulate material such as cement powder, grain or fertilizer, it is known that the material is fluidized when mixed with a transport medium, such as air, and thus may be conveyed and transported as if it were a fluid.

Systems utilizing suction techniques to transfer dry bulk particulate material are, of course, well known as described in U.S. Pat. No. 3,373,883, assigned to the Assignee of the present invention.

The prior art suction nozzles which were utilized in conjunction with such unloading systems suffered several disadvantages. A first disadvantage was the need for a blower or other source of external pressure to provide a transport medium such as air to fluidize and transport such material.

In an attempt to regulate the amount of transport air, elaborate pressure sensing damper mechanisms were developed. These of course were quite costly and not entirely satisfactory.

A second disadvantage with the prior art nozzles was caused by the nature of the particulate material. Specifically, with the prior suction nozzles, there was a significant amount of dust emission caused by the turning of the mechanical aerators and further that the nozzles did not perform satisfactorily when the level of particulate material remaining in the vessel was only of a shallow depth.

SUMMARY OF THE INVENTION

The present invention provides a unique solution by totally eliminating the need for a blower or other external force for the transport medium.

Furthermore, the present invention utilizes an improved suction nozzle configuration which eliminates the aforementioned problems and which regulates the amount of transport medium needed for fluidizing and conveying the dry bulk particulate material.

The nozzle is adapted to be connected to a vacuum pump, to provide suction as is conventional, and mechanical aerators are provided adjacent the end of the nozzle to assist in aerating the dry bulk particulate material and in moving the particulate material adjacent the opening of the nozzle. The nozzle has a first or intake end and a second end connected to an elongated conduit which is connected to the suction and to a separator. A tube positioned outside of the conduit has its first end open into the surrounding air and its second end opening into the nozzle between the nozzle first and second ends. When the suction is created, a transport medium such as air is drawn by the suction pressure through the tube and into the nozzle to mix with the dry bulk particulate material and thus fluidize the material so that the material may be drawn up or transported through the nozzle and the conduit.

Furthermore, a self regulating nozzle according to the present invention is configured to reduce the dust emission and to perform as desired even when there is only a small level of material remaining in the bottom of the barge being unloaded.

BRIEF DESCRIPTION OF THE DRAWINGS

The various objects and advantages of the present invention, together with other objects and advantages which may be attained by its use, will become more apparent upon reading the following detailed description taken in conjunction with the drawings.

In the drawings, wherein like referenced numerals identify corresponding parts of the system.

DETAILED DESCRIPTION OF THE INVENTION

Figure 1:
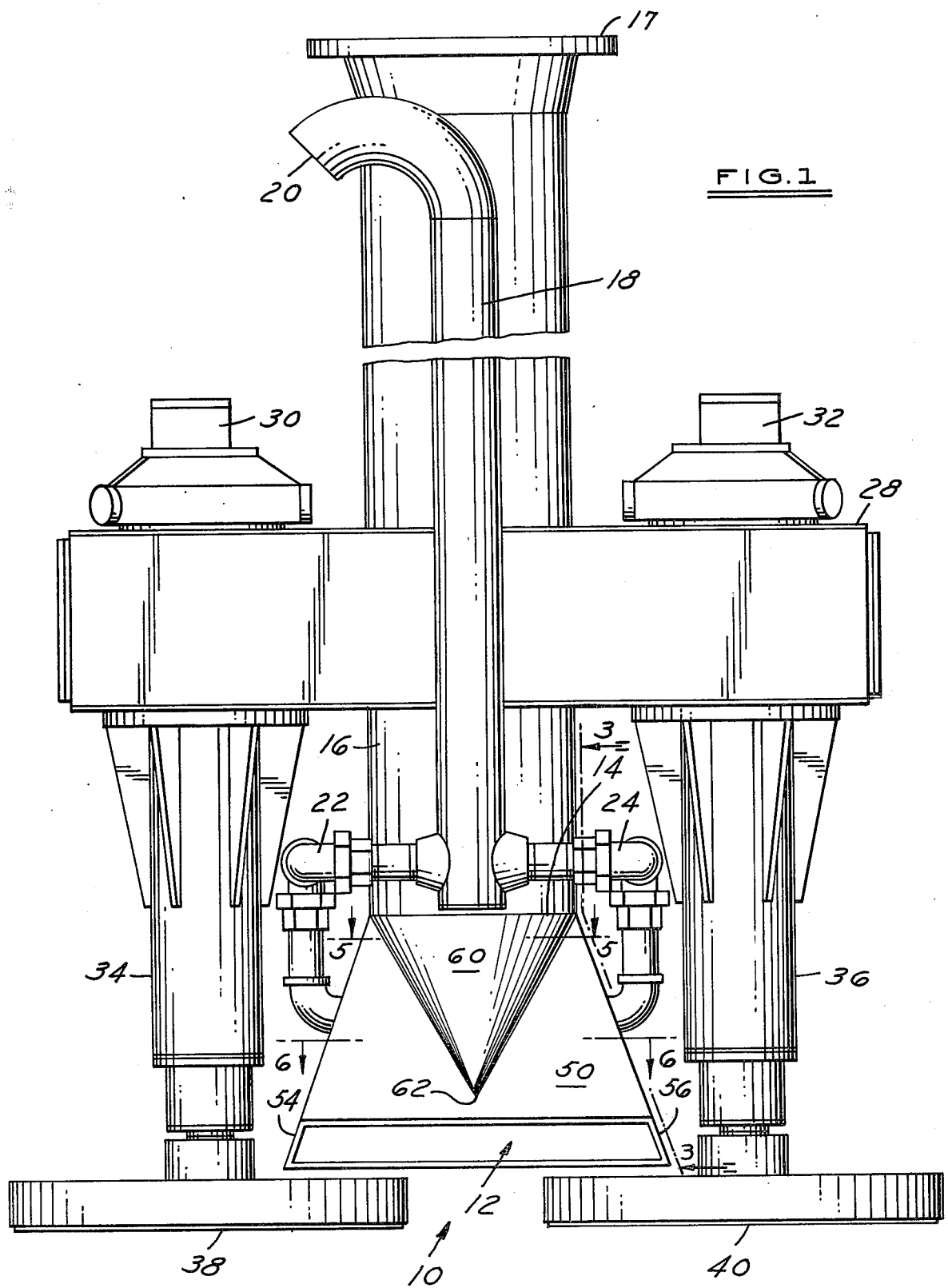
FIG. 1 is a front elevation view of the improved nozzle of the present invention and including its positional relationship with the mechanical aerators.

With reference to the drawings, the improved self regulating suction nozzle 10 of the present invention may be utilized to remove dry bulk particulate material from a container such as a ship, silo or the like as described in the aforementioned copending patent application.

The nozzle 10, which is hollow, has a first open end 12 and a second end 14 connected to a hollow conduit 16. The distal end 17 of the conduit 16 is to be connected to a conventional combined vacuum source and separator (not shown) and so that the material may be conveyed into a storage vessel or the like. The broad combination of a nozzle, conduit, vacuum source and separator is, of course, conventional.

Figure 3:
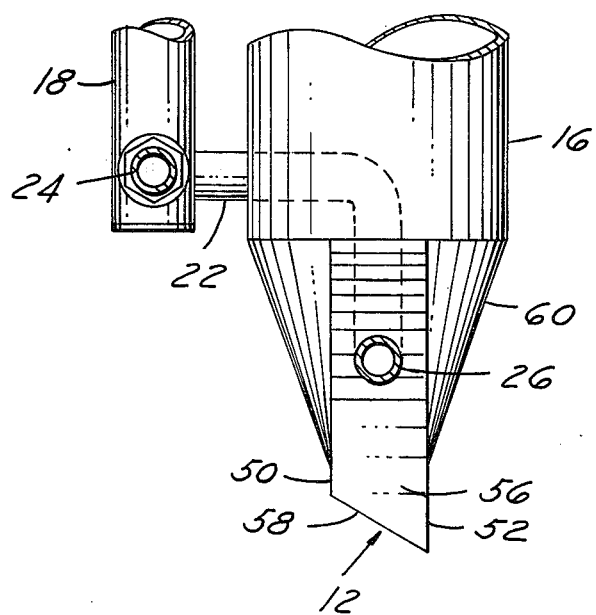
FIG. 3 is a partial side elevation view of the nozzle of the present invention as seen in the plane of arrows 3—3 of FIG. 1.

In order to transport the dry bulk particulate material it should be both aerated and fluidized. To fluidize the material it is necessary to provide a transport medium such as air to the nozzle. According to the principles of the present invention, an elongated hollow tube 18 is provided adjacent the conduit 16. This tube has an upper end 20 opening outwardly into the air and terminates at a lower end adjacent the nozzle second end 14. Two opposed conduits 22, 24 which interconnect the tube 18 to the nozzle 10 intermediate the nozzle ends provide the transport air to the nozzle. As illustrated in FIG. 3, tube 24 is connected to the nozzle as at 26.

Prior to the present invention, the use of a transport tube 18 required forcibly blowing the transport medium through such tube and into the nozzle or adjacent the nozzle at its open end. According to the principles of the invention, however, the present self regulating nozzle does not require any such external motivation of the transport medium.

The dry bulk particulate material is mechanically aerated and conveyed toward the nozzle opening 12. To accomplish this, a housing 28 is provided. Secured above the housing 28, at opposite ends thereof, are two motors 30, 32. The motor shafts 34, 36 respectively, extend downwardly from the housing and mechanical aerators 38, 40, are secured to the distal ends of the motor shafts 34, 36.

Figure 2:
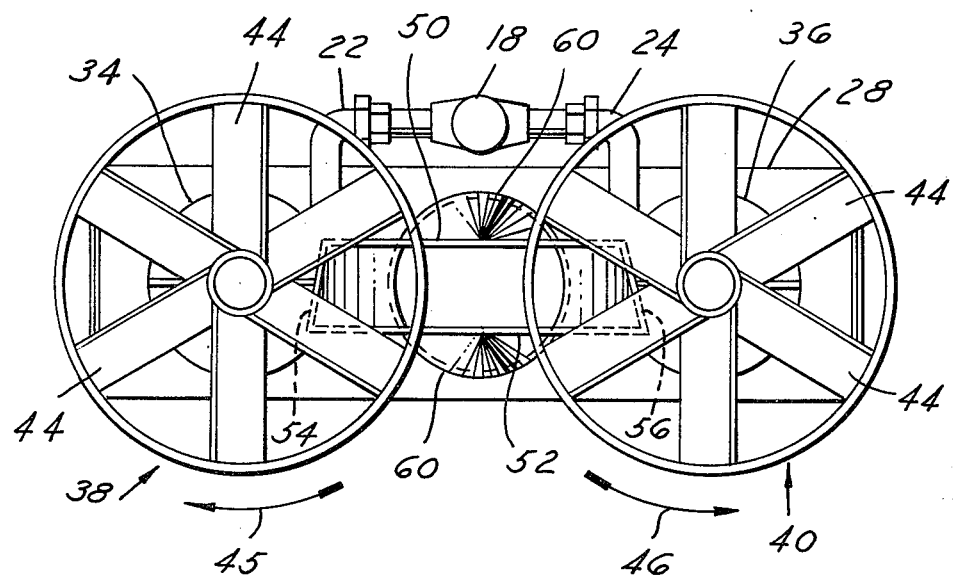
FIG. 2 is a bottom plan view of the aerators and nozzle of FIG. 1.

The aerators are illustrated in greater detail in FIG. 2 and each includes a series of blades 44 secured to and rotating with the motor shaft. The motors are driven in opposite directions, i.e., motor 30 would be driven clockwise as seen in FIG. 2 and motor 32 driven counter-clockwise, as indicated generally by the arrows 45, 46 to convey the dry bulk particulate material toward the nozzle opening 12.

One of the features of the present invention, namely the self regulation of the nozzle, will now be explained. The nozzle and aerators are interconnected to move vertically as a unitary construction. Thus, as may be appreciated, as the nozzle and aerators are lifted upwardly from the dry bulk particulate material, such as by the lifting device illustrated in the copending application, there is a reduced need for transport air because less material is being sucked up into the nozzle by the vacuum. Conversely, as the nozzle and aerators are lowered, there is an increased need for transport air because more material is to be sucked up by the nozzle.

According to the prior art, a blower was connected to the upper end of the transport air tube 18. A valve was also provided which was to be manually or mechanically adjusted to regulate the amount of transport air conveyed into the nozzle.

According to the present invention, neither a blower nor a valve is required. The suction through the conduit 16 provides the necessary pulling force to draw the proper amount of air through the transport tube 18 and the tubes 22, 24 into the nozzle.

Figure 7:
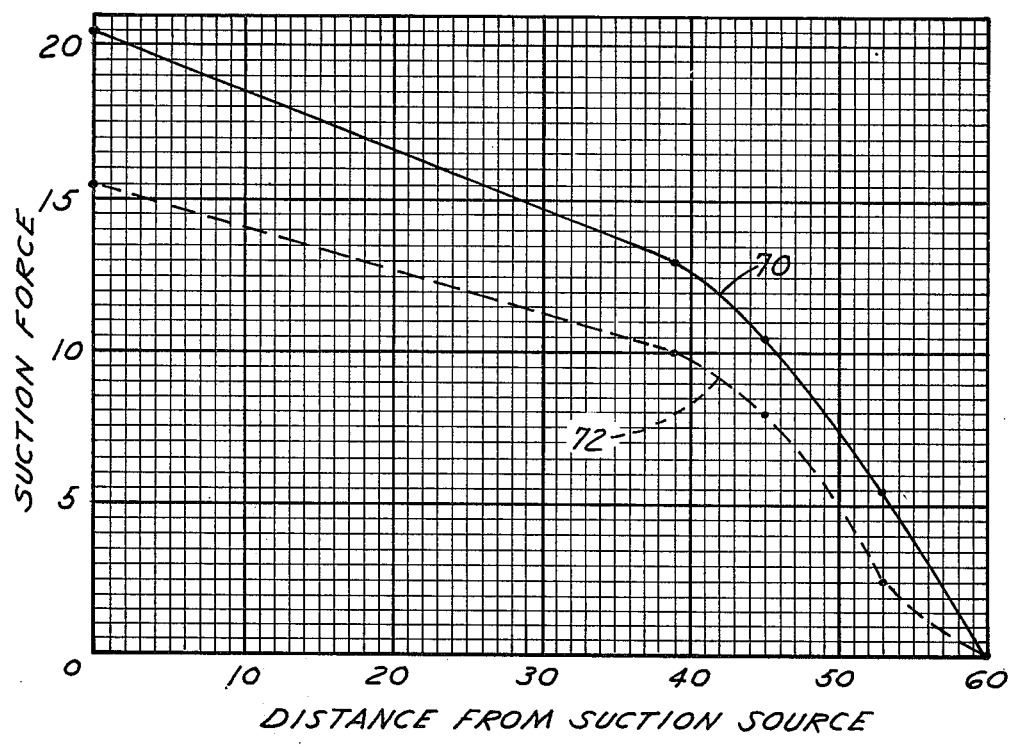
FIG. 7 is a diagrammatic representation of the suction pressure of the present system.

To explain this in greater detail, the operation of the suction nozzle will now be explained. With reference to FIG. 7, when the pump or vacuum source is actuated a certain degree or force of suction is created. Typically this would be 21 inches of mercury suction, i.e., a negative pressure of 21. If the nozzle was closed at its first end 12, such as by completely embedding the nozzle in the particulate material, the suction at nozzle end 12 would be zero. Suction readings taken along the conduit 16 would generally correspond to the curve 70 of FIG. 7 from the suction source (0 feet) to the nozzle (60 feet).

On the curve 70 at a distance of 55 feet from the source, or 5 feet from the end of the nozzle, the suction pressure is about 4 inches. Thus at a full rate of flow of material, the suction pressure 5 feet from the nozzle end, i.e., where transport tube 18 enters the nozzle as at 26, the suction of 4 inches pulls in transport air from the atmosphere.

If, however, there is less particulate material left in the vessel, the nozzle end 12 is not completely filled with the material. This is called reduced flow and the suction readings correspond to curve 72. At 5 feet from the nozzle, the suction pressure is now only about 2 inches. Thus less transport air is pulled in through tube 18.

The reduced flow, of course, corresponds to those instances where the nozzle is lifted and/or when there is a reduced depth of material in the vessel.

Thus the suction and the amount of particulate material at the nozzle regulates the amount of transport air drawn in through tube 18.

The second feature of the present invention, namely the configuration of the vacuum nozzle, will now be explained. As illustrated in the various Figures, the nozzle 10 includes a first hollow portion between its first and second ends 12, 14, which is trapezoidal in front elevation and rectangular in cross-section taken through a horizontal plane. More specifically in front elevation, the top 14 and bottom 12 of the nozzle are the parallel bases of the trapezoid.

The first portion of the nozzle thus includes a front face 50, a rear face 52, and side edges 54 and 56. The rear face 52 extends downwardly away from the second nozzle end 14 a greater distance than the front face 50. By virtue of this additional depth of the rear face 52, the cross-sectional area of the nozzle opening, which is thus oblique or angular relative to the long vertical axis of the nozzle and conduit, is of greater corss-sectional area than if both faces 50 and 52 of the nozzle extended an equal distance down from the second end of the nozzle 14. This greater cross-sectional area provides a scoop-like effect and has several advantages. A first advantage is the reduction of dust emissions. A second advantage, resulting from the tapered or scoop-like configuration, is that as the dry particulate material is conveyed by the aerators toward the nozzle, the tapered configuration as along the edge 58 (FIG. 3) causes a substantially larger cross-sectional area of the nozzle to open toward this material than if the taper 58 did not exist.

Figure 4:
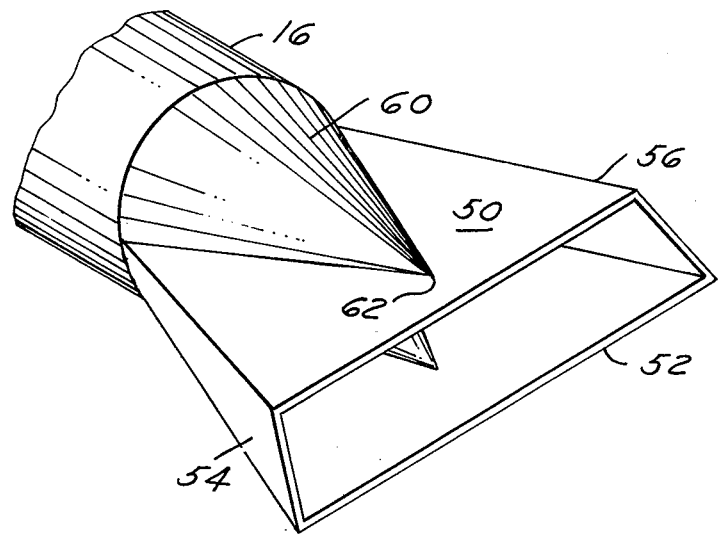
FIG. 4 is a partial perspective illustration of the nozzle according to the principles of the present invention.

Referring again to FIGS. 4, 5 and 6, other details of the nozzle construction will now be illustrated. The nozzle also includes a second portion 60 of generally conical configuration. This conical configuration extends outwardly from the faces 50, 52 and upwardly from a lower apex 62, slightly above the first end 12 of the nozzle. The conical portion 60 terminates at the upper end 14 of the nozzle.

Figure 5:
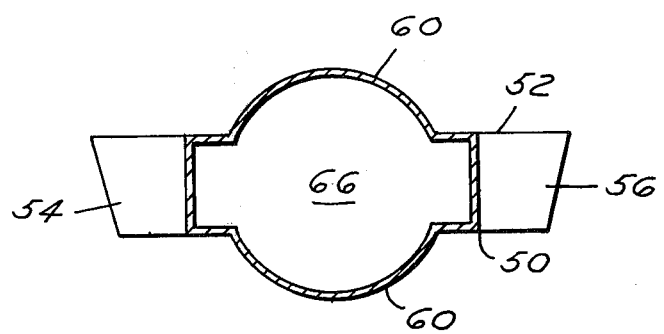
FIG. 5 is a cross-sectional view as seen in the plane arrows 5—5 of FIG. 1.
Figure 6:
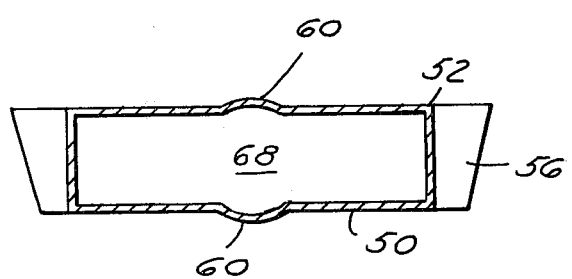
FIG. 6 is a cross-sectional view as seen in the plane of arrows 6—6 of FIG. 1.

With reference to FIGS. 5 and 6, two views taken through horizontal planes through the nozzle, it may be appreciated that the hollow interior of the nozzle at each plane provides a substantially constant internal area by virtue of the reduced rectangular configuration of the nozzle plus the conical portion of the nozzle.

Thus, in FIG. 5, the hollow internal cross-sectional area of the nozzle illustrated as 66 is equal to the hollow internal cross-sectional area of the nozzle 68 illustrated in FIG. 6.

By maintaining the internal cross-sectional area of the nozzle substantially constant between the nozzle first and second ends 12, 14, a greater efficiency is achieved. The nozzle edges 54, 56 extend laterally outwardly over the aerators 38, 40, toward the motor shafts 34, 36 a sufficient amount to permit proper evacuation of particulate material from a barge when there is a shallow depth of material remaining. This is illustrated in FIGS. 1 and 2.

Thus the second feature of the nozzle is the combined conical taper and trapezoidal taper to provide a substantially constant internal cross-sectional area of the hollow nozzle.

The foregoing is a complete description of the preferred embodiment of the present invention. Various changes may be made without departing from the spirit and scope of the invention. The invention, therefore, should be limited only by the following claims.

What is claimed is:

1. For use in a vacuum system for unloading dry bulk particulate commodities by suction, an improved nozzle of the type having first and second ends with the second end adapted to be connected to a conduit and then to a suction as is conventional for drawing said material through said nozzle first end and through said nozzle second end and through said conduit, the improvement comprising:

said nozzle being generally configured as a hollow trapezoid and including a first hollow portion having front and rear parallel faces and having said edges, said nozzle first end being tapered with said rear face extending away from said nozzle second end farther than said front face to provide an oblique nozzle opening of greater cross-sectional area than if said first and second faces extended the same distance from said nozzle second end, to thereby reduce dust emission from the movement of said commodities;

said nozzle further including a second hollow portion generally configured as a conical surface and formed integral with said first hollow portion front and rear faces, said conical surface being tapered upwardly and outwardly from adjacent said nozzle opening first end toward said nozzle second end;

the taper of said conical surface and the taper of said trapezoid each being such that the internal hollow cross-sectional area of the nozzle, taken in a plane perpendicular to the longitudinal axis of the nozzle, is substantially constant at any plane between said nozzle first end and said nozzle second end; and a hollow tube positioned outwardly of said conduit and having a first end opening directly into an ambient transport medium such as air and a second end communication with the interior of said nozzle;

so that upon connecting the conduit to the suction and inserting the nozzle first end in said dry bulk particulate material, the amount of transport medium drawn through the tube is self regulated by the amount of dry bulk particulate material at the nozzle first end so that the necessary amount of transport medium is drawn through the tube and into the nozzle to transport the dry bulk particulate material without such material clogging the first end of the nozzle.

2. The invention as defined in claim 1 wherein said nozzle first portion is generally configured as a trapezoid in front elevation.

3. The invention as defined in claim 1 wherein said nozzle first and second ends terminate in planes parallel to each other.

* * * * *